United States Patent
Wedekind

(10) Patent No.: US 9,132,596 B2
(45) Date of Patent: Sep. 15, 2015

(54) METHOD AND DEVICE FOR ALIGNING A BELT STRIP

(75) Inventor: Werner Wedekind, Salzhausen (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 44 days.

(21) Appl. No.: 14/111,982

(22) PCT Filed: Apr. 12, 2012

(86) PCT No.: PCT/DE2012/000395
§ 371 (c)(1),
(2), (4) Date: Nov. 15, 2013

(87) PCT Pub. No.: WO2012/139556
PCT Pub. Date: Oct. 18, 2012

(65) Prior Publication Data
US 2014/0054129 A1  Feb. 27, 2014

(30) Foreign Application Priority Data
Apr. 12, 2011 (DE) .......................... 10 2011 018 723

(51) Int. Cl.
| | |
|---|---|
| *B29D 30/30* | (2006.01) |
| *B65H 9/16* | (2006.01) |
| *B29D 30/00* | (2006.01) |
| *B29D 30/46* | (2006.01) |
| *B29D 30/70* | (2006.01) |
| *B29D 30/42* | (2006.01) |
| *B29D 30/44* | (2006.01) |

(52) U.S. Cl.
CPC ........ *B29D 30/0016* (2013.01); *B29D 30/3007* (2013.01); *B29D 30/46* (2013.01); *B29D 30/70* (2013.01); *B29D 2030/427* (2013.01); *B29D 2030/4412* (2013.01); *B29D 2030/4418* (2013.01)

(58) Field of Classification Search
CPC ................ B29D 2030/0665; B29D 2030/0634
USPC ........... 156/64, 405.1, 406.4; 198/806, 836.3, 198/844.2
See application file for complete search history.

(56) References Cited

U.S. PATENT DOCUMENTS

| | | | | |
|---|---|---|---|---|
| 3,921,795 | A * | 11/1975 | Vandale et al. | ............... 198/382 |
| 4,411,724 | A * | 10/1983 | Ito et al. | ..................... 156/304.1 |
| 4,457,802 | A * | 7/1984 | Yanagihara et al. | ........ 156/405.1 |
| 4,769,104 | A | 9/1988 | Okuyama et al. | |
| 4,857,123 | A * | 8/1989 | Still et al. | ....................... 156/133 |
| 4,892,609 | A * | 1/1990 | Nakanome et al. | ........ 156/406.4 |

(Continued)

FOREIGN PATENT DOCUMENTS

| | | |
|---|---|---|
| DE | 3926721 XY | 2/1991 |
| EP | 0649730 XY | 4/1995 |

(Continued)

*Primary Examiner* — Douglas Hess
(74) *Attorney, Agent, or Firm* — Lucas & Mercanti, LLP; Klaus P. Stoffel

(57) ABSTRACT

The method and the device serve for aligning a belt strip, which has a middle part and triangular end pieces. The belt strip is wound onto a tire building drum in such a way that the triangular end regions extend next to one another, at least in certain regions. At least one of the triangular regions is changed in its alignment, at least in certain regions. This achieves the effect that the triangular regions extend next to one another on the tire building drum with matching edge contours

21 Claims, 10 Drawing Sheets

(56) References Cited

U.S. PATENT DOCUMENTS

| | | | |
|---|---|---|---|
| 5,167,751 A * | 12/1992 | Shimizu et al. | 156/502 |
| 5,271,790 A * | 12/1993 | Nojiri et al. | 156/405.1 |
| 5,389,187 A * | 2/1995 | Marks et al. | 156/405.1 |
| 5,720,837 A | 2/1998 | Regterschot et al. | |
| 5,904,788 A * | 5/1999 | Kitajima et al. | 156/64 |
| 6,547,906 B1 * | 4/2003 | Kolker et al. | 156/123 |
| 6,984,285 B2 * | 1/2006 | Nauta | 156/264 |
| 7,138,021 B2 * | 11/2006 | Auclair | 156/64 |
| 8,221,569 B2 * | 7/2012 | Iwasaki | 156/117 |
| 2007/0114715 A1 | 5/2007 | Auclair | |

FOREIGN PATENT DOCUMENTS

| | | |
|---|---|---|
| WO | 2005009726 A | 2/2005 |
| WO | 2005065924 A | 7/2005 |
| WO | 2005087481 Y | 9/2005 |

* cited by examiner

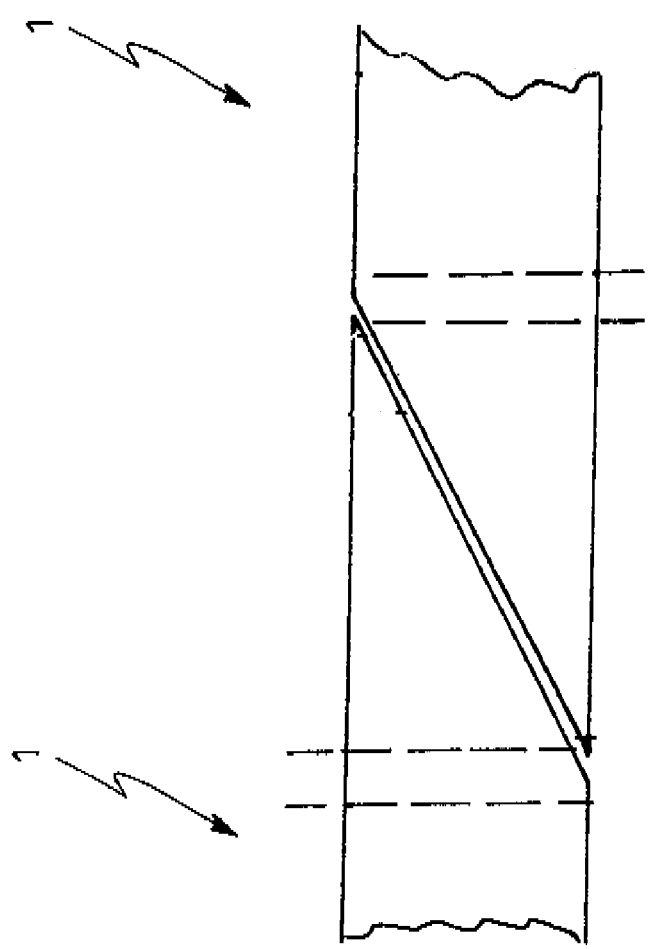

METHOD AND DEVICE FOR ALIGNING A BELT STRIP

The present application is a 371 of International application PCT/DE2012/000395, filed Apr. 12, 2012, which claims priority of DE 10 2011 018 723.5, filed Apr. 12, 2011, the priority of these applications is hereby claimed and these applications are incorporated herein by reference.

BACKGROUND OF THE INVENTION

The invention pertains to a method for aligning a belt ply which has a middle part and triangular end pieces and which is wound onto a tire-building drum in such a way that at least certain parts of the triangular end areas extend next to each other.

The invention also pertains to a device for aligning a belt ply which has a middle part and triangular end pieces and which is wound onto a tire-building drum in such a way that at least certain parts of the triangular end areas extend next to each other.

For the production of radial tires, the standard approach is to supply the prefabricated belt plies to a tire-building drum by the use of so-called belt servers. The position of the belt server can be adjusted transversely to its transport direction. The purpose of this transverse shift in the position of the belt server is to compensate for deviations in the shape of the middle part of the belt ply from an ideal rectangular form, this shift being accomplished after at least part of the leading triangular area of the belt ply has been fixed in place in the downstream area of the transport route leading to the tire-building drum, i.e., the area located behind the belt server.

Typically what happens during this step is a so-called center regulation or edge regulation. The position at the time in question is detected by the use of optical sensors such as CCD cameras. The above-described form correction for belt plies has proven reliable in the production of tires intended for use on passenger vehicles. In the production of tires which are intended for use on trucks, however, special requirements are imposed because of the large dimensions of the belt plies. Here the previously mentioned method and the corresponding device do not always lead to optimal results.

SUMMARY OF THE INVENTION

The goal of the present invention is therefore to improve a method of the type described above in a way which makes it possible to improve the alignment of the belt ply.

This goal is achieved according to the invention in that the alignment of least a certain part of one of the triangular areas is changed.

An additional goal of the present invention is to improve a device of the type described above in a way which makes it possible to improve the alignment of the belt ply.

This goal is achieved according to the invention in that the alignment of at least a certain part of at least one of the triangular areas is changed.

By means of the inventive method and the inventive device, it becomes easier to align the belt plies intended in particular for the production of truck tires. For these types of tires, the trend is toward smaller and smaller belt angles; currently, a typical minimal angle is in the range of 15°±1.5°. Such small belt angles have the result that the extent to which the triangular areas extend in the longitudinal direction is very large in relation to the total surface area of the belt ply. In the extreme case, the two triangular areas lie directly adjacent to each other or overlap each other in the transport direction with no rectangular middle part between them.

By the use of the present method, it is possible to ensure that, after the two triangular areas have been wound into the tire-building drum, these two areas will come together to form a butt joint of sufficient quality. This is achieved in that the two edges of the material to be brought together are aligned directly with each other. The belt angle actually present enters into the nominal value for the regulation step in question.

According to the present method, therefore, the greatest possible importance is given to the mutual relationship of the two sides of the butt joint. Tolerances in the material lead to width variations on the drum, but they will be symmetric to the center line. As a result, the demand for maximum possible tire quality is fulfilled.

The actual belt angle can be measured instrumentally in various ways. For example, two sensors can be used to detect the cut edges after the ply has been cut during its forward transport. Preferably, however, three or more sensors are used to support the calculation of a mean value for the angle.

A cutting blade is suspended with freedom to move sideways so that it can line up with the course of the wire strands within the tolerance range for the angle. The deflection of the blade at the moment in question, together with the associated position of the blade, which is determined and detected by a servo drive, yields the necessary information concerning the actual angle.

So that even belt plies with overlapping triangular areas can be arranged in centered fashion on the tire-building drum, it is advantageous to determine the actual width even before the ply reaches the cutting device. For this purpose, a suitable sensor system is used in combination with a tracking function which operates via the servomotor-based conveyor belt drive. Simultaneously, the width of the belt is also monitored to verify its dimensional accuracy.

It is preferable for the two transport belts of the ply-laying belt unit to be driven individually. When irregularities in the course of the joint on the tire-building drum are found by the measuring device, for example, they can be corrected by a suitable method. In this case, when the nominal value for the automatic control is being specified, an appropriate offset can be generated as a profile over the entire butt joint. It is also possible to compensate for irregularities by driving the two transport belts of the ply-laying belt unit at different speeds or by routing them differently as the ply is being laid on the drum.

The goal of the invention is to bring a belt ply consisting of tip, middle part, and tip, or, in special cases, consisting of the tips without a parallel middle part, onto a tire-building drum in completely automated fashion in such a way that the ply is centered and the butt joint is closed.

As a result of the manufacturing process, the width of the belt ply naturally varies within certain tolerances. On the drum, the center of the ply should deviate as little as possible from the center of the drum. Ensuring this increases the quality of the tire, because the manufacturing tolerances are thus minimized.

The butt joint of the belt must be formed on the tire within narrow tolerances as defined in the specifications. In the normal case, the edges of the ply are not permitted to overlap at all at the butt joint. Any gap which may be present may not, as a rule, exceed the pitch of the belt cord.

To fulfill these requirements, the belt ply server consists essentially of a cutting belt unit and laying belt unit. The cutting belt unit 6, located on the side where the belt material first enters, contains a mechanical precentering device 7 and a belt cutting device 8. In addition, the cutting belt unit is supported in such a way that an actuating drive 9 can move it from side to side. A CCD camera 10 at the transition from the cutting belt unit to the laying belt unit 11 detects the position of the edges of the ply relative to the center of the laying belt unit and thus also relative to the center of the tire-building drum.

The inventive goal is achieved in that, as the belt ply is being conveyed from the cutting belt unit onto the laying belt unit, it is aligned in such a way that the center of the ply lies on the center of the laying belt unit, and also so that the slanted edge at the front end of the belt ply is parallel to the slanted edge at the back end of the belt ply. This alignment is preserved as the belt ply is transferred from the laying belt unit to the tire-building drum.

When a preparation cycle for a new belt ply is started, the tip of the precentered belt ply is conveyed by the cutting belt unit toward the laying belt until it is detected by the linear array of the CCD camera. The camera detects both the straight edge and the slanted edge. The position of the straight edge relative to its distance from the center of the laying belt unit is now compared with the nominal value in an automatic control unit. If the actual value deviates from the nominal value, the control unit transmits an actuation signal to the actuating drive. This drive now shifts the cutting belt unit, on which the belt ply is resting, until the actual value is identical to the nominal value.

The nominal value for the straight edge corresponds to the distance between half the width of the ply and the center of the laying belt unit. Because, as a result of manufacturing tolerances, the actual width of the actual ply deviates from the prescribed width, the nominal value used for the alignment of the front tip must be based on the actual value.

As a result, the straight edge of the front tip is positioned at the same distance from the center of the laying belt unit as the edges of the middle area of the ply. There will therefore not be any discontinuity along the straight edge at the transition between the forward tip and the middle part of the ply. For the actual width of the ply, the value for the ply which was processed just before the current one can be used. This is feasible, because any changes in the width of the ply in a roll of belt material take place very slowly over relatively long belt lengths. As an alternative, the actual width can also be measured 6 at the beginning of the cutting belt unit 1.

After the forward tip has been aligned according to the nominal value, the belt ply is now transferred to the laying belt unit under continuous automatic control. To prevent the deformation of the ply, the upper surfaces of the two conveyor belts must be running at exactly the same speed. This is ensured by, for example, the use of positively engaging toothed belts as conveyors. During the alignment of the straight edge, the slanted edge is also detected by the CCD camera. These values for the position of the forward slanted edge are used to align the rear slanted edge of the belt ply. From these angles, an angle which functions as a nominal value as a straight line for the alignment of the rear slanted edge can be calculated. Alternatively, the form of the forward slanted edge can be stored, and this form can then be used as the nominal value for the alignment of the rear slanted edge.

During the alignment of the rear tip, in contrast to the alignment of the forward tip, the actual value of the slanted edge is compared in the automatic control unit with the previously mentioned nominal value derived from the position of the forward slanted edge. If deviations are present, the actuating drive on the cutting belt unit 1 receives an actuating signal from the control unit. The actuating drive now shifts the cutting belt until the actual value matches the nominal value. Because, in this case, the automatic control is based on a line which is at a slant to the transport direction, the nominal value changes continuously as the conveyor belt moves forward.

During the alignment of the rear tip, the straight edge is detected by the camera simultaneously. The evaluation makes it possible to verify that the center deviation and width of the ply in the splice area lie within the permissible tolerances.

BRIEF DESCRIPTION OF THE DRAWING

Exemplary embodiments of the invention are illustrated schematically in the drawings.

DETAILED DESCRIPTION OF THE INVENTION

Figure 1:
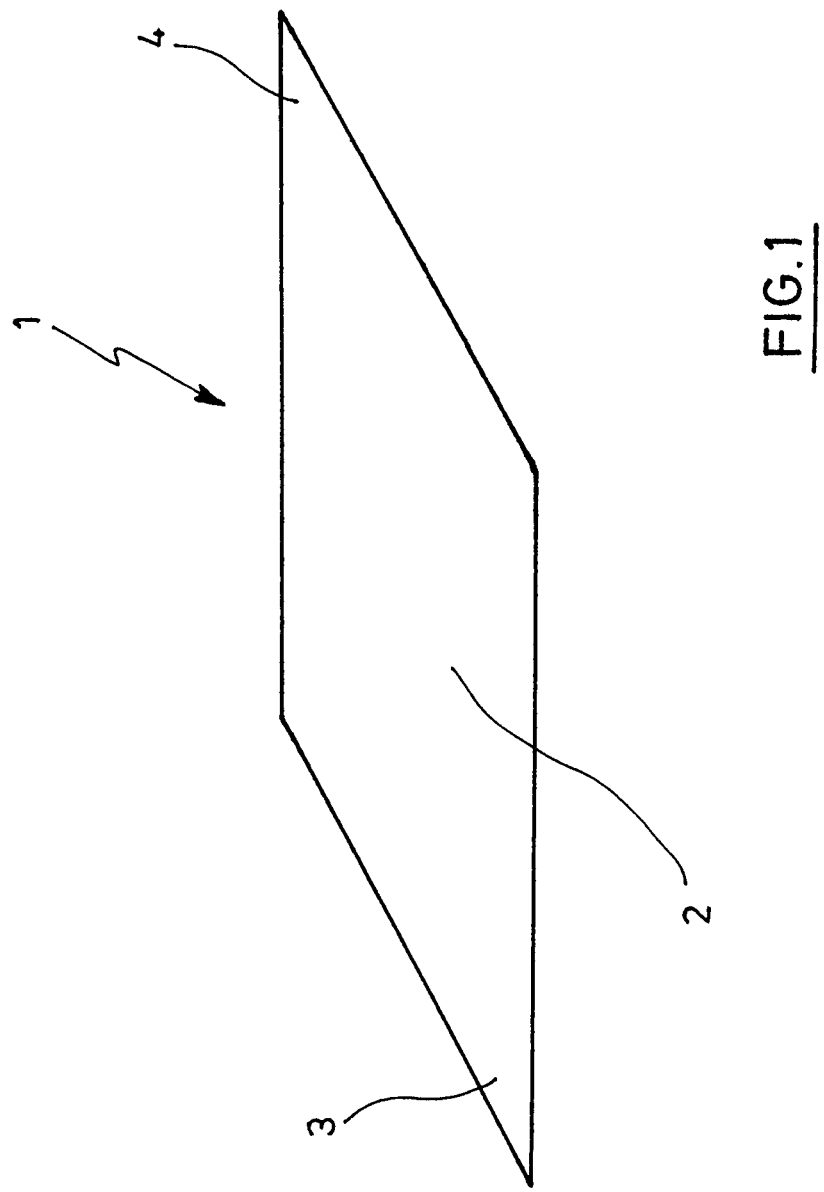
FIG. 1 shows a schematic top view of a belt ply.

An essential feature of the method is to be seen in that the positioning of the triangular area is automatically controlled on the basis of an edge of the ply. A nominal value is provided on the basis of an actual measurement of the ply. If a rectangular middle part is present between the triangular areas of the belt ply, the value for the width measurement can be determined from this. If the triangular areas overlap each other, the value for the width measurement in question is obtained by a separate measurement.

The location of the cut edge is detected at the same time that the width measurement is made. The associated position of the location is stored.

In the second step of the method, the middle part, if present, is centered. In the final step, the downstream triangular part is automatically adjusted on the basis of the cut edge. The nominal value for this is the cut edge of the tip of the ply.

According to an alternative method, the positioning of the triangular area is based on the cut edge. The actual belt angle is used as the nominal value for this purpose.

This can be determined, for example, from the lateral position of the blade during the cutting operation. During the next step of the process, the middle area is centered, and in a final step the rear tip is positioned as a function of the cut edge. The actual belt angle is again used as the nominal value, in analogy to the form correction made in the case of the triangular area at the front.

According to another alternative, it is possible to convey the material of the belt ply from the cutting belt unit to the laying device without a form correction. Only the position present at the time of transfer from the cutting belt unit to the laying belt unit is detected. The drum is shifted axially when the belt ply is laid on the tire-building drum. The nominal value in this case is the cut edge.

The belt angle is preferably determined by means of three sensors. The belt angle is also preferably measured downstream of the cutting bar. The width is detected preferably upstream of the cutting bar.

The alignment of the triangular area based on the side edge begins under consideration of the actual width under simultaneous detection of the slanted cut side.

Upon conclusion of the form correction for the triangular area at the front of the ply, the actual value at the cut edge is used as a nominal value for the automatic control based on the cut edge at the rear of the ply. The nominal value from this point on is specified on the basis of the instrumentally measured or interpolated belt angle.

Shortly before the transition to the automatic centering control phase, the form correction for the triangular area is turned off; it is then reactivated shortly after the transition to automatic centering control.

Shortly before the transition to the automatic edge control of the downstream triangular area, the automatic control is turned off again and then reactivated shortly after the transition.

The actual value of a slanted edge is used as a nominal value, and from the associated point in time on, a calculation is carried out on the basis of the determined belt angle and used as a nominal value for the following automatic control processes.

With respect to the form correction of the triangular area, it is especially desirable to subject at least the opposite-facing pointed end areas to the form correction, because the width of the material here is relatively small, and these areas therefore have an especially strong tendency to become deformed. In the extreme case, the pointed end areas can assume an "ear-like" shape.

FIG. 1 shows a belt ply 1, which comprises a middle part 2 and triangular end pieces 3, 4.

Figure 2:
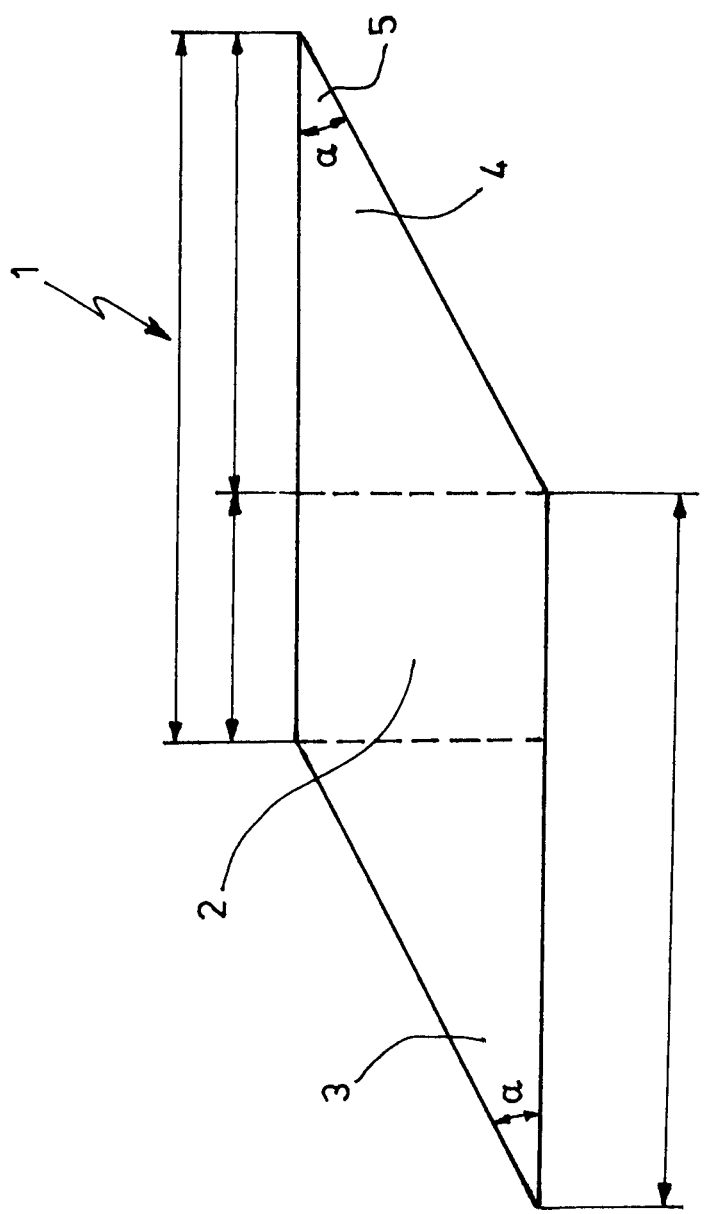
FIG. 2 shows the belt ply according to FIG. 1 with indication of a rectangular middle part and triangular end pieces and also with indication of belt angles.

FIG. 2 illustrates the belt ply 1 according to FIG. 1, where additional areas and a belt angle 5 have also been drawn in.

Figure 3:
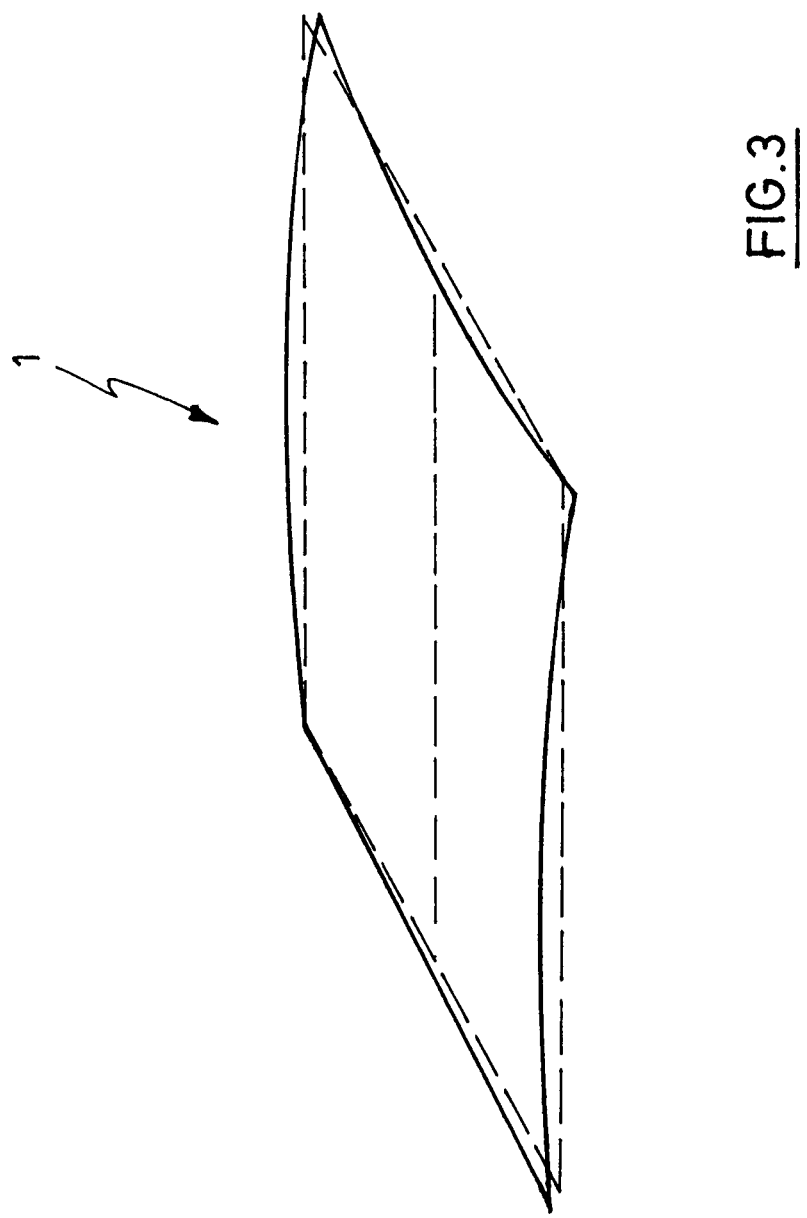
FIG. 3 shows, in solid line, a diagram of a real form of a belt ply without form correction and, in broken line, an ideal contour.

FIG. 3 shows a belt ply 1 with an ideal contour in broken line and with a real contour in solid line.

Figure 4:
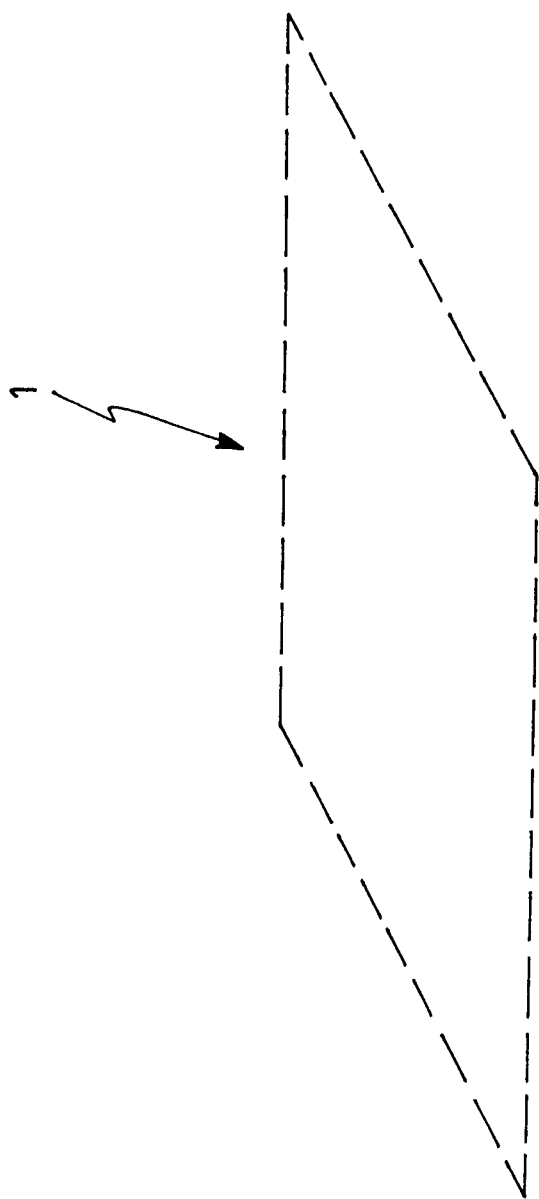
FIG. 4 shows the ideal contour of the belt ply according to FIG. 3.

FIG. 4 illustrates again an ideal contour, and

Figure 5:
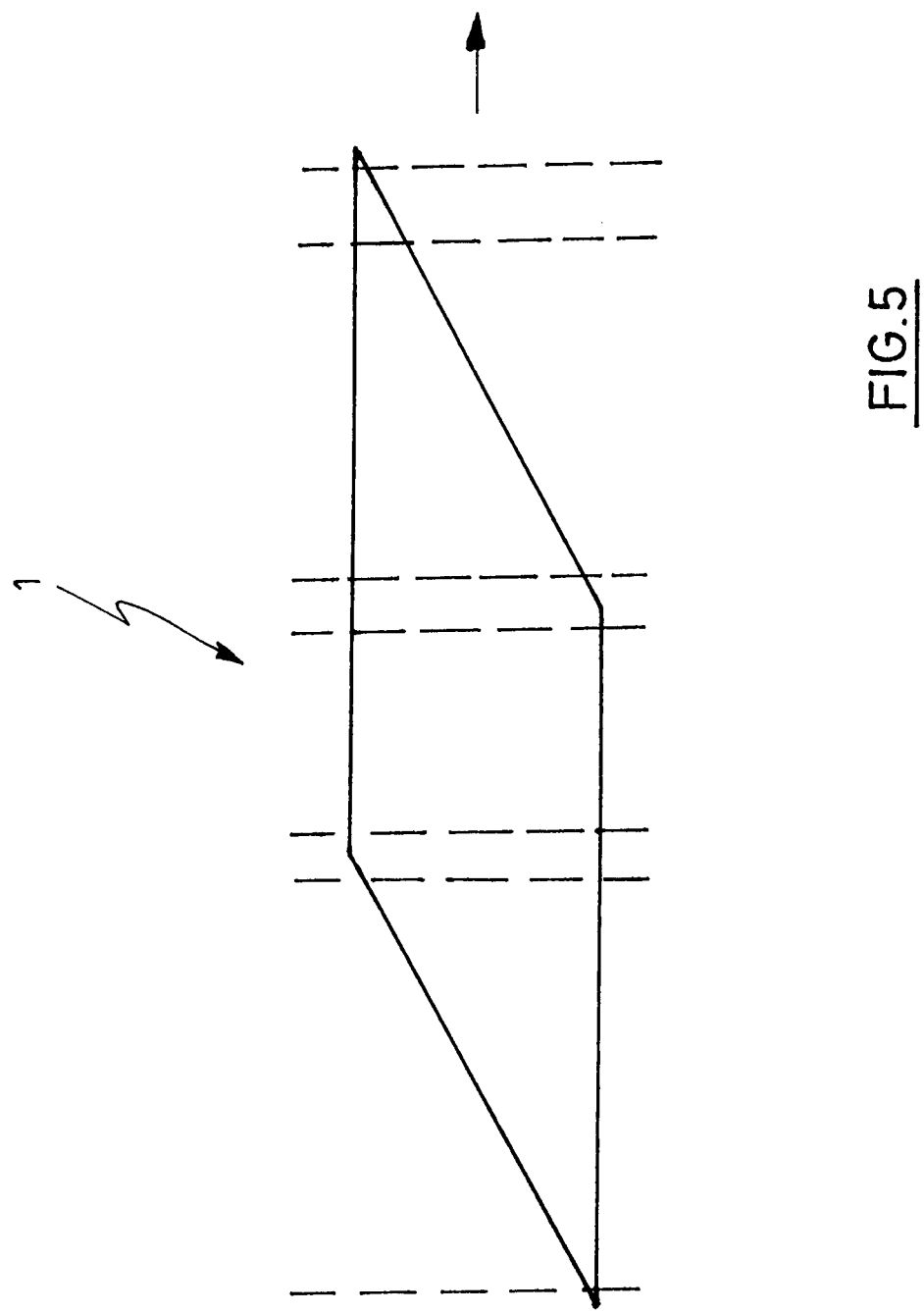
FIG. 5 shows a diagram of a belt ply with additional auxiliary lines.

FIG. 5 shows an ideal contour with the definition of additional areas.

Figure 6:
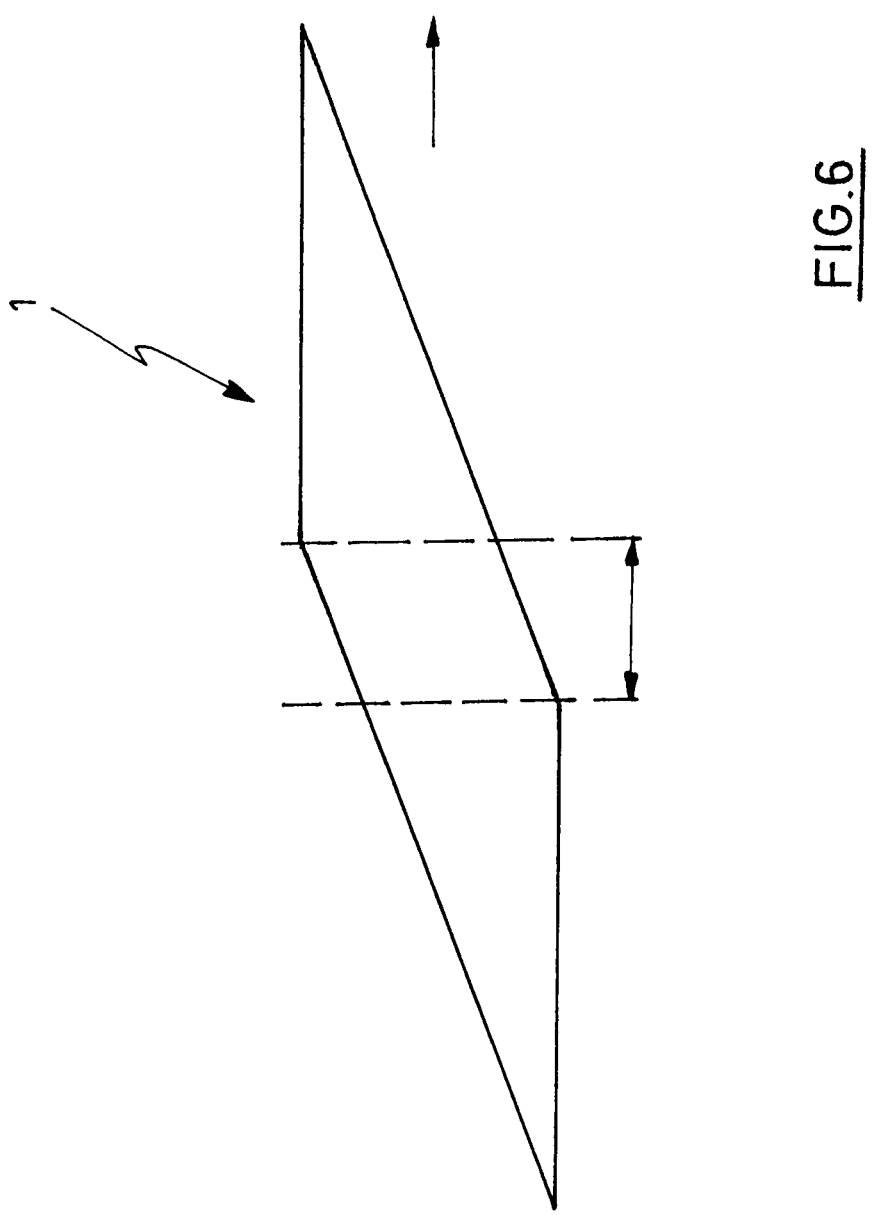
FIG. 6 shows a belt ply with the triangular areas overlapping in the transport direction with no rectangular connecting part between them.

The embodiment shown in FIG. 6 shows the contour of a belt ply 1 which is typically used for truck tires.

Figure 7:
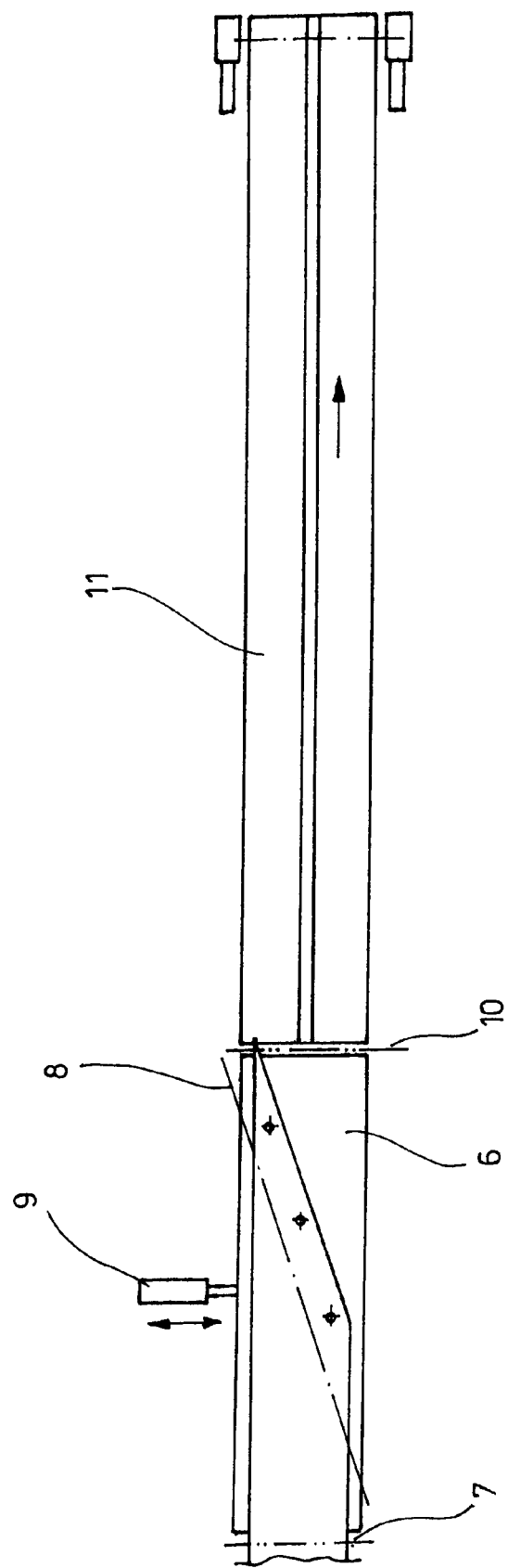
FIG. 7 shows a schematic top view of a belt server.

FIG. 7 shows a schematic view of a belt server from above.

Figure 8:
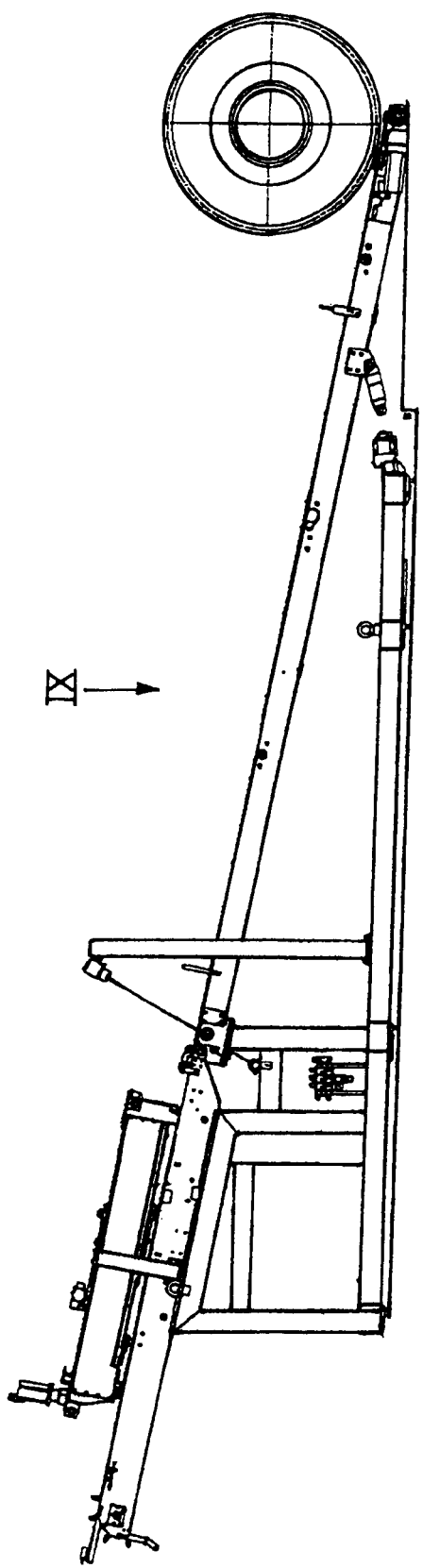
FIG. 8 shows a side view of a belt server with the associated tire-building drum.

FIG. 8 shows a side view of the belt server, and

Figure 9:
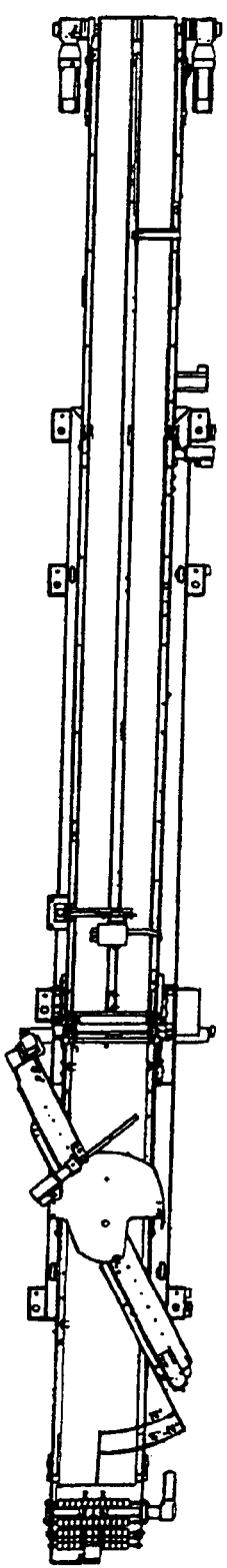
FIG. 9 shows a top view as seen in direction IX in FIG. 8.

FIG. 9 shows a view of the belt server from above.

Figure 10:
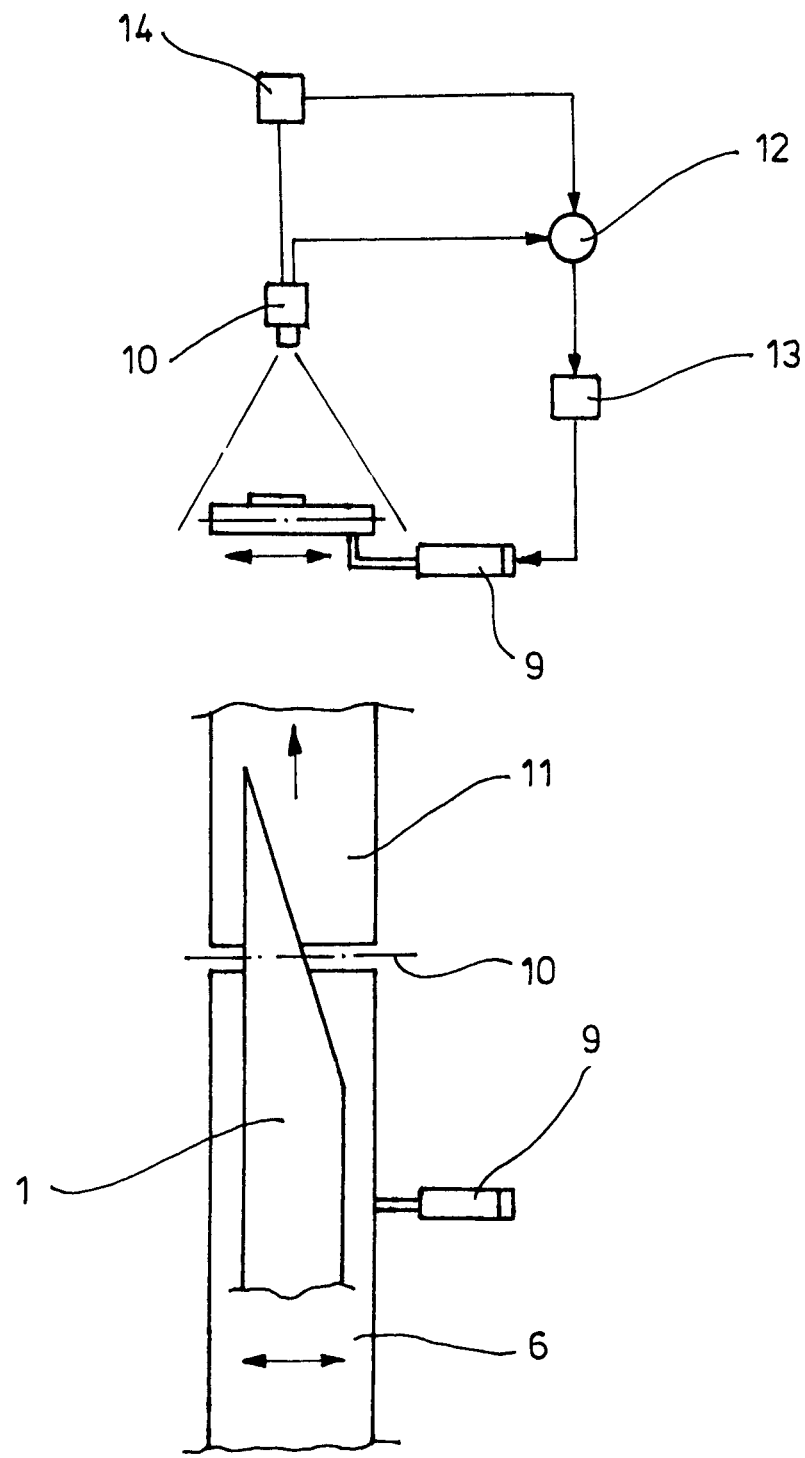
FIG. 10 shows a sketch of the automatic control components.

FIG. 10 illustrates the individual components already shown in FIG. 7, i.e., the components which have been incorporated into an automatic control circuit for carrying out the various steps of the alignment process.

It is possible to see the cutting belt unit 6, the laying belt unit 11, the camera 10, and the actuating drive 9. Also included in the drawing are a difference-forming unit 12 and a control amplifier 13. The camera 10 is connected to an evaluation device 14, which can operate with three different work steps. In the first step, a forward slant is detected, and the slanted edge is stored. Then the angle is determined for use as a nominal value for the rear slant. Alternatively, the entire form as the nominal value.

In the second step, the width of the middle part of the ply is determined and stored. This is the nominal value for the straight edge at the front.

In the third step, the rear straight edge is determined and stored. This serves as a control for the center deviation and for controlling the width of the ply in the area of the splice.

The invention claimed is:

1. A method for aligning a belt ply that has a middle part and triangular end pieces having triangular end areas and which is wound onto a tire-building drum so that at least certain parts of the triangular end areas extend next to each other, the method including changing alignment of at least certain parts of at least one of the triangular end areas, and detecting a location of at least one cut edge, wherein a nominal value for aligning the cut edge of a rear triangular end area is derived from the detection of the cut edge of a front triangular end area.

2. The method according to claim 1, including, to align the triangular area, holding a pointed area of the end piece facing away from the middle part in place and then transversely shifting the belt ply.

3. The method according to claim 1, including detecting a belt angle.

4. The method according to claim 3, wherein an angle setting of a belt cutting device is adapted automatically to a currently detected belt angle.

5. The method according to claim 1, including detecting a width of the belt ply.

6. The method according to claim 1, including carrying out at least one measurement with a CCD camera.

7. The method according to claim 1, including aligning two triangular areas so that their cut edges are at an equal angle.

8. The method according to claim 1, wherein, during the alignment based on a straight edge, a form of a cut edge of another triangular end area is detected.

9. The method according to claim 1, wherein, during the alignment of a rear area based on the cut edge, the form of a straight edge is detected by a camera also used to monitor a width and a center deviation in an area of a splice.

10. The method according to claim 1, including briefly deactivating automatic control at a transition from the triangular end pieces to the middle part.

11. The method according to claim 1, wherein, at a transition between a front triangular end piece and the middle part, an automatic control is switched over directly from automatic edge control to automatic center control.

12. The method according to claim 1, wherein, at a transition between the middle part and the triangular end piece, automatic control is switched over from automatic center control to automatic edge control of a straight edge and then to automatic edge control of a cut edge.

13. The method according to claim 12, wherein the switchover to automatic edge control of the cut edge occurs as a function of actual width of the tire.

14. The method according to claim 12, wherein the switchover to automatic edge control of the cut edge occurs as a function of length of the ply.

15. The method according to claim 12, wherein the switchover to automatic edge control of the cut edge occurs as a function of a beginning of the rear triangular end piece.

16. The method according to claim 1, wherein the alignment is achieved by shifting a cutting area.

17. The method according to claim 1, wherein the alignment is achieved by shifting the tire-building drum.

18. A device for aligning a belt ply which comprises a middle part and triangular end pieces and which is wound up on a tire-building drum in such a way that at least certain parts of triangular end areas extend next to each other, the aligning device comprising: a measuring device; and an actuating device, wherein the alignment of at least certain parts of at least one of the triangular end areas is changed by the measuring device and the actuating device, wherein the measuring device comprises at least one camera that detects a location of at least one cut edge, wherein a nominal value for aligning the cut edge of a rear triangular end area is derived from the detection of the cut edge of a front triangular end area.

19. The device according to claim 18, wherein the measuring device comprises at least one CCD camera.

20. The device according to claim 19, and further comprising a cutting belt and a laying belt, wherein the CCD camera is arranged in a transition area between the cutting belt and the laying belt.

21. The device according to claim 20, wherein the cutting belt is transversely positionable, and further comprising an actuating drive for positioning the cutting belt.

* * * * *